Nov. 5, 1968 M. J. MARKAKIS 3,409,900

GAP SCATTER CORRECTION APPARATUS

Filed Oct. 7, 1965 3 Sheets-Sheet 1

INVENTOR.
MICHAEL J. MARKAKIS

BY Robert S. Clay

ATTORNEYS

INVENTOR.
MICHAEL J. MARKAKIS
BY Robert S. Clay
ATTORNEYS

INVENTOR.
MICHAEL J. MARKAKIS

BY Robert G. Clay

ATTORNEYS

United States Patent Office 3,409,900

Patented Nov. 5, 1968

3,409,900
GAP SCATTER CORRECTION APPARATUS

Michael J. Markakis, Palo Alto, Calif., assignor to Ampex Corporation, Redwood City, Calif., a corporation of California Filed Oct. 7, 1965, Ser. No. 493,796
5 Claims. (Cl. 346—74)

ABSTRACT OF THE DISCLOSURE

System for recording binary digital signals in parallel on a magnetic tape despite the existence of gap scatter in a multi-channel head assembly, including means for varying the energization level of each head to provide pulse lengths on the magnetic tape which are proportional to the displacement of the respective head gap from a selected reference line transverse to the direction of the tape movement.

This invention relates to magnetic recording, and more particularly to devices and methods for alignment of digital data patterns in a magnetic recording system.

Magnetic tape devices are increasingly being used as asynchronous systems for the recordation and the transfer of data, because a number of such devices now permit the direct preparation of records in a computer compatible format. Heretofore, it has been necessary to use other asynchronous systems, such as those employing punch cards and perforated paper tape, and after preparing these records to use special translator equipment or computer time to prepare magnetic tapes in the standard computer format. The standard computer format utilizes not only organized blocks of data and specified inter-record gaps, but also utilizes a standard recording density of 200, 556, 800 or 1600 bits per inch (b.p.i.). The density is usually referred to in terms of bits per inch, even though multiple channels are used and this actually refers to the number of characters or frames recorded per inch. Generally, it is preferred to have as high a density as feasible, because this constitutes more effective use of the storage medium and permits higher data transfer rates. A number of factors, however, contribute to static and dynamic misalignment of the tape, and must be compensated or accounted for during recording or reproduction in order to prevent the occurrence of error. One of the basic factors is a relative displacement between individual head gaps in a multi-head assembly, generally known as gap scatter. Although every effort is made to construct individual magnetic cores and pole tips that are identical, and positioned in precise alignment, it is not feasible to achieve exact alignment. Accordingly, in a direction relative to a center line extending along the recording gaps on the heads, some of the gaps may be displaced slightly forwardly and other rearwardly, and there may also be slight differences in width. Although so minute that they cannot be discerned except under a microscope, these displacements give rise to appreciable time displacement in reproduced signals. For example, if data is recorded at 800 b.p.i. on a tape that is reproduced at 150 i.p.s., the data transfer rate is 120 kcs., with a time displacement between individual bits of less than 10 microseconds. Accordingly, a displacement adequate to give rise to a time variation of 5 microseconds introduces ambiguities and therefore errors in reproduced data.

These problems are well recognized, and various techniques have been utilized to compensate for the effects of gap scatter. The most common technique is to selectively delay the energization of the individual heads in a multihead assembly, in a compensatory fashion relative to the gap scatter. Thus, the heads are not energized concurrently and the result is precise parallelism between all the bits of a given character frame. A similar gap scatter problem exists for signal reproduction, and other delay techniques adjusted for the scatter distribution in the given head assembly are utilized here as well. Compensation during reproduction, however, cannot in practice be altered to a particular scatter characteristic existing during recording, because tapes must be recorded and reproduced interchangeably on different transports.

Delay line techniques are not suitable, of course, if the tape is stationary when the recording is made. One of the significant developments in magnetic tape transports has been the generation of capabilities for stepping the extremely small increments which are needed for computer compatible formats, while also achieving relatively high stepping rates, such as 650 steps per second or more. This is of course far beyond the capability of standard keyboard and other manual inputs, but is well within the date transfer capabilities of most standard automatic data acquisition devices. In many of such systems it is preferred to record while the tape is stationary, then to complete the incrementing movement and await a new character. Recording while stationary has a number of advantages, including the elimination of the need for buffer storage and the elimination of variations in tape speed. Inherently, however, gap scatter in the recording heads cannot be compensated for by the known techniques. While various clock track and other redundancy techniques can be used for increasing packing density despite the presence of gap scatter displacements, these are to be avoided because of the cost and complexity they introduce.

It is therefore an object of the present invention to provide an improved system for magnetically recording data on the magnetic tape.

Another object of this invention is to provide improved asynchronous recording devices that record multiple binary digits in precise parallelism despite gap scatter in a stationary recording medium.

A further object of this invention is to provide improved methods of recording digital signals on magnetic media.

A further object of this invention is to provide improved systems for asynchronously recording digital data on magnetic media in a stationary recording mode.

These and other objects are achieved by devices and methods in accordance with the invention which utilize a selected degree of over-driving of the magnetic recording head to establish a controlled flux distribution pattern of variable length on the magnetic tape. The magnetization pattern of each binary digit in the successive recording channels for a given frame is varied in the direction of movement of the tape so as to place the greatest flux gradient at the leading or lagging edge in parallel for all the channels. On reproduction, unique signal excursions for the various channels appear in time coincidence.

In a specific example of a recording device in accordance with the invention, a multi-channel head assembly for a magnetic tape recorder of the incrementing type and operable to record while the tape is stationary is coupled to be energized by data signals from a source. The gap scatter is compensated for by energizing the individual heads with signals having amplitudes sufficient to drive the recording medium to saturation, but varying so as to provide differing lengths of flux patterns on the tape. Flux distribution under the head gaps vary in Gaussian fashion, with the point of steepest slope at the leading and lagging edge varying lengthwise relative to the nominal center line of the recorded patterns in accordance with the amplitude of the driving signal. On reproduction of these data signals by a conventional magnetic playback head, the induced current is responsive to the rate of change of flux in the recorded patterns. This differentiated signal includes pulse peaks in time coincidence for the different channels. In one example of this system in accordance with the invention, record signals of an amplitude sufficient to establish saturation recording are variably attenuated although the saturation level is maintained. In another example, data signals are amplified with varying degrees of gain to establish energizing flux sufficient to reach selected over-saturation levels in accordance with aspects of the invention previously described.

A better understanding of the invention may be had by reference to the following description, taken in conjunction with the accompanying drawings, in which.

Figure 1:
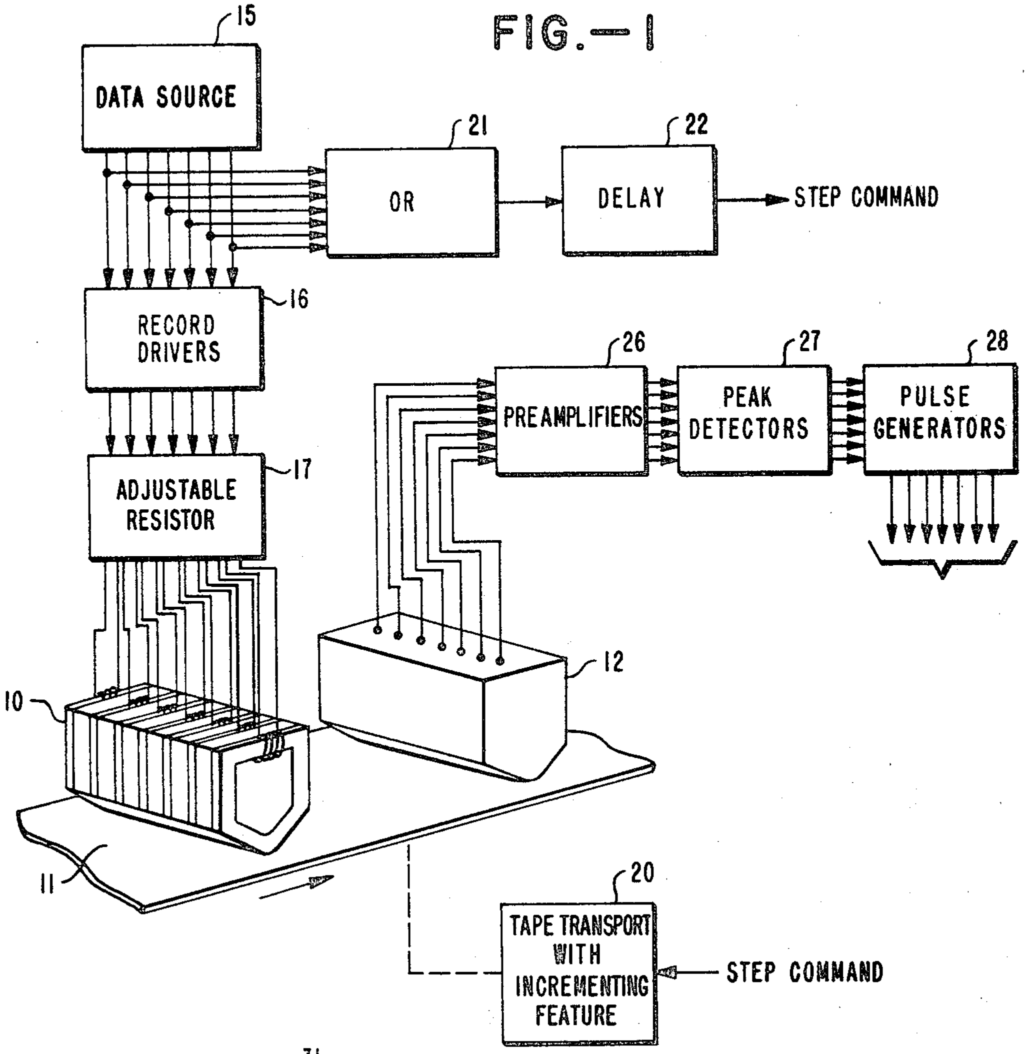
FIG. 1 is a perspective view of an asynchronous magnetic tape recording system utilizing a multi-channel head assembly subject to gap scatter, and including in block diagram form circuits for compensating for head gap scatter in accordance with the invention.

Referring to FIG. 1, a multiple channel recording head 10 or write head assembly is held in contact with a tape or other recording medium 11 for recording of binary data. A similar multi-channel reproduce or playback head assembly 12 contacts the tape 11 at a downstream position in the direction of tape travel. The reproduce head 12 is shown merely for purposes of description, inasmuch as the data acquisition system need operate only in the record mode.

The input circuit for the write head assembly 10 includes a multi-channel data source 15 in which signals on each line represent binary "1" or "0" states for the individual digits of a binary-coded or binary-coded decimal character. The simultaneous signals on the various lines permit simultaneous recording of a complete binary-coded decimal or other character in one frame on the tape. The output pulse of each line in the data source 15 is applied to its own respective driving circuit in a group of record drivers 16 for energizing a corresponding individual head in the write head assembly 10. The record drivers are selected to have sufficient gain and power to generate a current in the coil of each head at a level well above the level needed for saturation magnetization of the tape. Coupled between the record drivers 16 and the write head assembly 10 is a group of adjustable resistors 17 for varying the amplitude above tape saturation level of the energizing pulse in each line.

The tape motion is governed by an incremental tape transport 20 in response to a step command sequence which holds the tape 11 stationary for recording a character in one frame, and then moves the tape a given incremental distance for recording the next character in the next frame. Each signal line between the multi-channel data source 15 and the parallel record drivers 16 is coupled to the input side of an OR gate 21. A pulse of a given polarity on any one or more of these lines, indicating the recording of a character, causes an output from the OR gate 21. The output pulse from the OR gate 21 is connected to the incremental tape transport 20 through a delay circuit 22 to provide the step command. The delay circuit 22 is timed to activate the incremental tape transport 20 immediately after the data pulses have reached the write head assembly 10 and recorded a character, and move the tape into position for recording the next character in the next frame. This is merely an illustration of one relatively simple control circuit that may be used to govern the stepping action.

It is assumed that for playback on the same transport 20 the tape 11 is driven at a continuous speed. As a given frame passes under the playback head assembly 12, each recorded binary digit in a different track induces a current in the corresponding head immediately above it in the playback head assembly 12. The read current pulse is proportional to the rate of change of flux and generates a peak of one polarity at the maximum increasing flux gradient of a recorded magnetization pattern and a peak of opposite polarity at the maximum decreasing flux gradient. The induced read current is amplified at a preamplifier 26 and then applied to a peak detector 27, which is responsive to the first peak of one or either polarity, dependent on the recording format, to actuate a pulse generator 28, from which data output is read.

Figure 2:
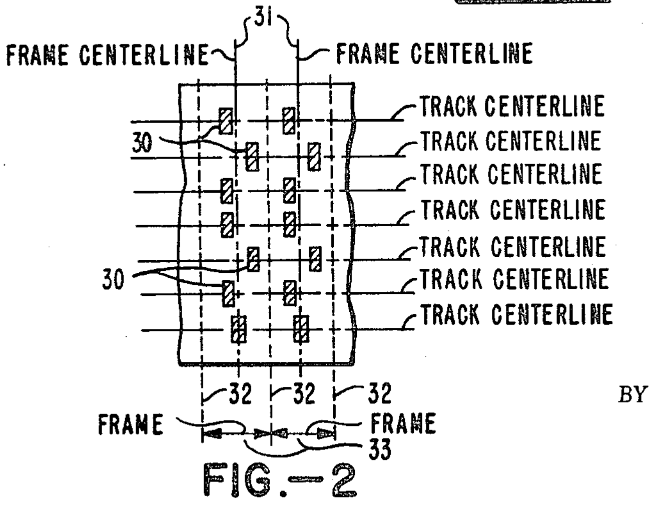
FIG. 2 is a schematic representation in exaggerated form illustrating the effects of uncompensated head gap scatter on recorded patterns.

Perfect parallel alignment for the head gaps in the write head assembly 10 cannot be achieved in spite of the best machinery and assembly techniques. The nature of a typical pattern of resulting gap scatter on the tape 11 is illustrated in FIG. 2. The magnetization patterns 30 lead and lag a nominal transverse centerline 31 in accordance with head misalignment in the write head assembly 10. It is clear that the frame boundaries 32 have to be adequately separated to insure that all binary digital patterns 30 for a given character are included in a given frame 33, unless clock tracks are at the ends or interspersed. If the magnetization patterns 30 in a given character are perfectly aligned in a given frame 33, the frames can be spaced much closer together, permitting increased packing density without the need for clock tracks and the attendant circuit complexity.

In accordance with the present invention, the length of the magnetized pattern recorded in each track of the tape 11 is adjusted by varying the relative amplitudes of the energizing current pulses in the write head assembly 10. Although the center of each magnetization pattern along the tape 11 remains misaligned in accordance with the head misalignment in the write head assembly 10, the point of maximum flux gradient within each magnetization pattern, which corresponds to the first induced read current peak, is translated along the tape 11 to lie on the same transverse lines for a given frame. The current pulse amplitude above the level needed to saturate the tape is varied by setting the adjustable resistors 17. Thus the energizing signals are variably adjusted to correct for gap scatter in the heads of a given write head assembly 10.

Figure 3:
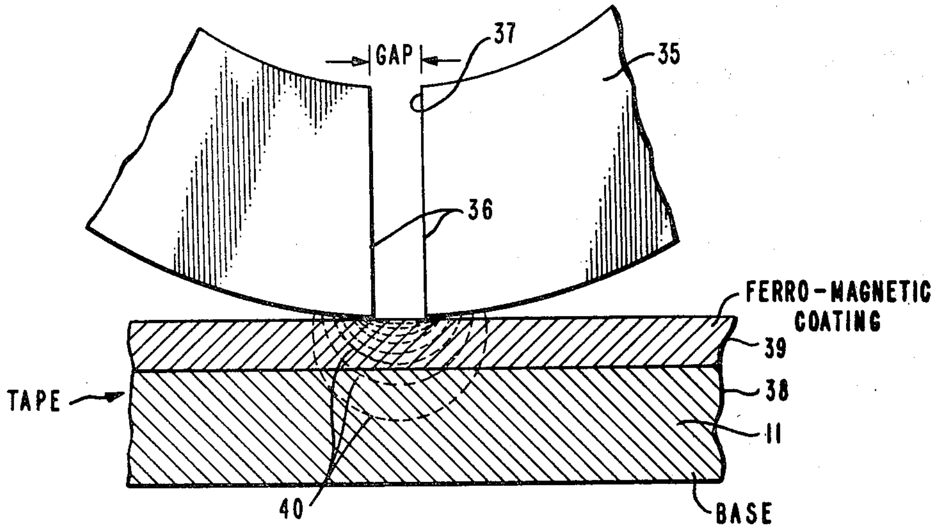
FIG. 3 is a side view of the pole tip region of a single magnetic head in contact with a magnetic tape, showing in enlarged and simplified form the flux distribution in the recording region during energization of the head.

The variation of the length of a magnetization pattern along the tape 11 by varying the amplitude of the driving current pulse can best be explained with reference to FIG. 3 through FIG. 6. FIG. 3 is an enlarged representation of a single magnetic head 35 with poles 36 and non-magnetic gap 37 shown in stationary contact with the tape 11. The tape 11 has a substrate 38 and a thin ferromagnetic coating 39 that is magnetized by the fringing magnetic flux lines 40 emanating from the head 35. The fringing flux lines are substantially hemispherical and connect the poles 36, with the innermost flux lines having somewhat less curvature. The density of the flux 40 decreases with distance from the gap 37. It is clear from FIG. 3 that the inner, most dense, flux creates the strongest magnetization in the tape 11, but that this exists only in the narrow region opposite the gap 37. In other words, the inner flux lines establish a narrow area of high flux density. The flux further out is spread over a greater region away from the gap 37, but is less dense and establishes less magnetization in the tape. A summation of the contributions from all flux lines 40 in the tape coating 39 produces the Gaussian shaped magnetization pattern 44 seen in FIG. 4, where the total magnitude of magnetization at any point in the magnetizable tape surface 39 is plotted against length on either side of the non-magnetic gap 37.

If the current in the write head assembly 10 is increased, the density of flux lines 40 is proportionately increased, tending to create a longer magnetization pattern of Gaussian shape. The height of the Gaussian curve 44, which represents total magnetization at a given point, is limited by the saturation level of magnetization in the magnetic coating 39. If the region with the highest magnetization opposite the gap 37 is already at the saturation level, increased magnetic flux can only increase tape magnetization on either side of the maximum point, or along the sides of the Gaussian curve 44. Thus, variation of the amplitude of the energizing current pulse over saturation varies only the length of the magnetization pattern recorded in the tape 11, as shown by the lines A′, A″ and A‴.

Figure 5:
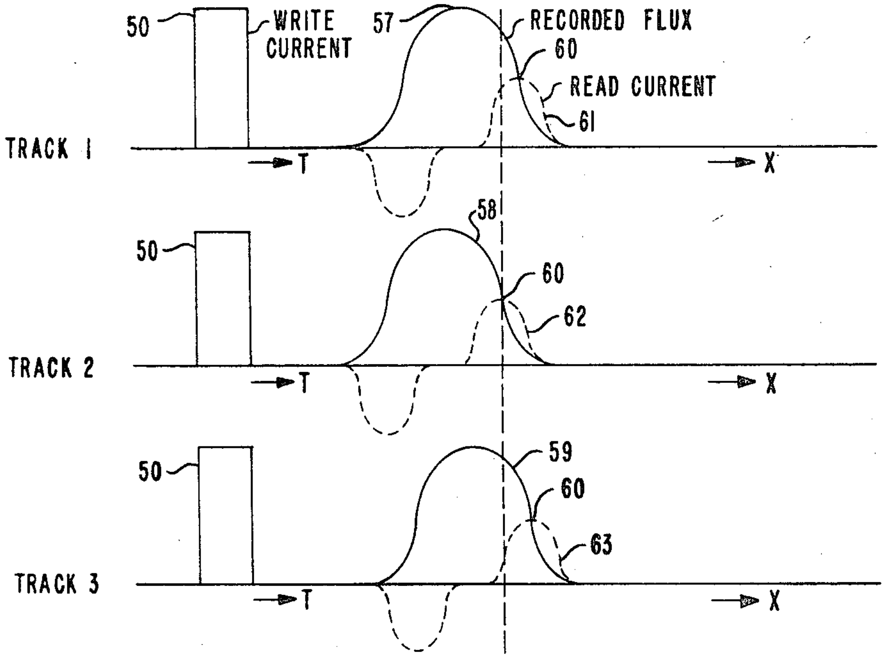
FIG. 5 is a set of related graphs of waveforms useful in illustrating the relationships of the driving current pulses, magnetization patterns, and induced playback signals in three tracks of typical parallel digital recording.
Figure 6:
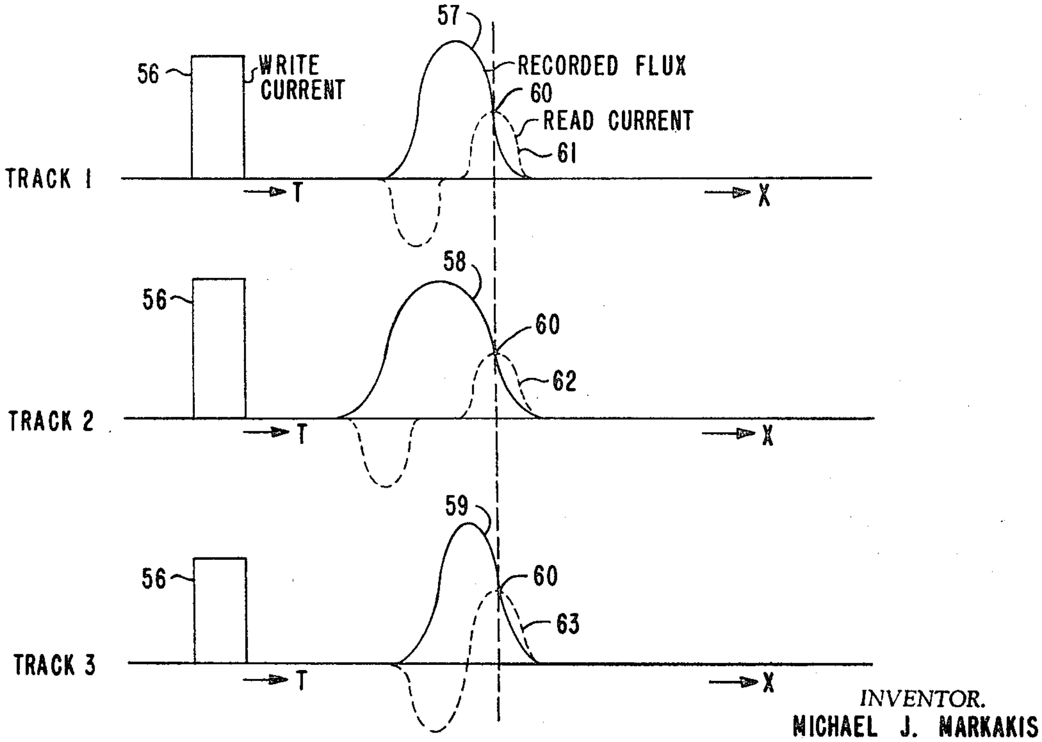
FIG. 6 is a similar set of graphs of waveforms useful in illustrating results obtained from methods in accordance with the invention.

The operation of the system can best be seen in FIG. 5 and FIG. 6. In FIG. 5, equal driving current pulses 50 in three separate channels create magnetization patterns of equal height and length which are misaligned due to gap scatter in three tracks of the tape 11. The broken line curves 61, 62 and 63, represent the induced read current for each magnetization pattern and show longitudinally misaligned positive pulse peaks at the maximum flux gradient of each magnetization pattern. The amplitude of each current pulse is well above the level required to saturate the tape. In FIG. 6, the waveforms illustrate the variations after the adjustable resistor network 17 has been set to vary the amplitude of the current pulses 56 above saturation in accordance with the present invention. Although the center peak of each magnetization pattern 57, 58 and 59 still lies opposite the non-magnetic gap of its misaligned head, the length of the patterns 57, 58 and 59 has been changed, translating the points of maximum flux gradient 60 into alignment. The positive pulse peaks of the induced read current 61, 62 and 63, which constitute the data output, now lie in perfect alignment.

It is clear that the general methods in accordance with the invention utilize longitudinal shifting of given characteristic points of the recorded magnetization pattern. In the example described above, it has been assumed that the tape 11 is to be moved in the same direction for playback as for recording. Consequently, the adjustable resistors 17 have been set to align the points of maximum flux gradient 60, (increasing or decreasing depending on the polarity of the pattern recorded) which lie ahead or downstream of the pattern maxima. If the tape 11 is to be played back in the reverse direction, the settings can be made to align the points of maximum flux gradient which follow or lie upstream of the pattern maxima, permitting compensation for playback in the reverse direction. In either mode of operation, the first peaks of the induced read signal generated in response to maximum change in flux occur in time coincidence despite the effect of gap scatter in the recording head assembly 10. In NRZ recording, where only the edge 60 remains, playback in either direction is possible with a single adjustment.

Figure 4:
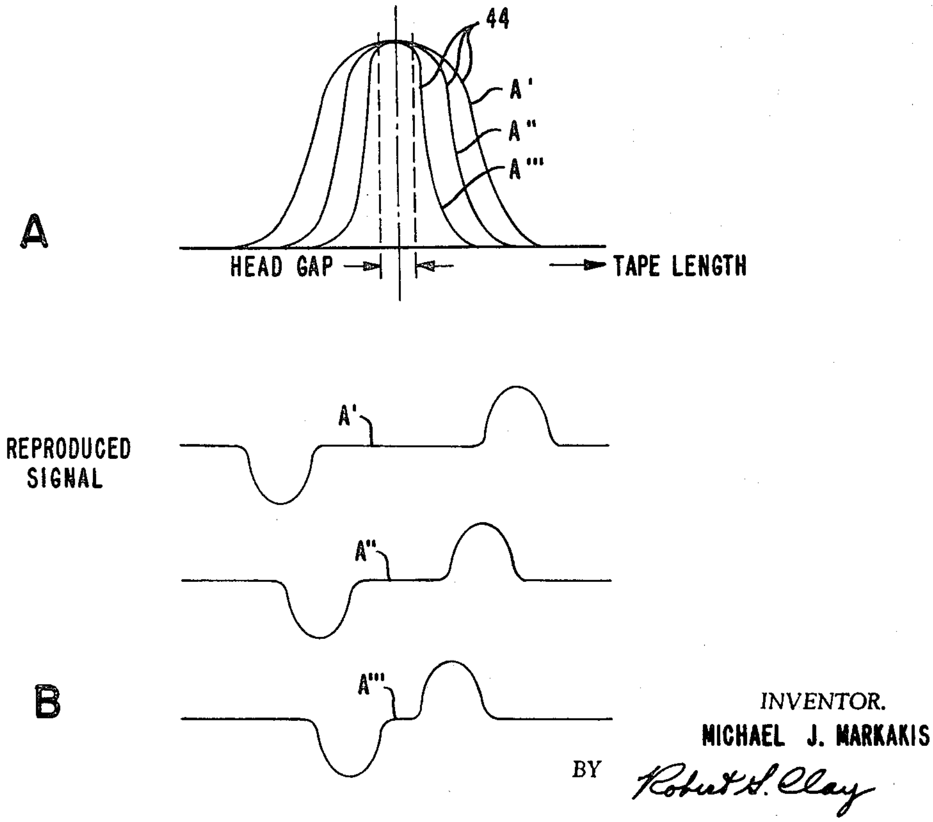
FIG. 4 is a diagrammatic representation of various waveforms and flux distributions occurring in the operation of devices in accordance with the invention, and including waveforms of different energizing pulses, and the length of flux distributions existing in the recording medium.

Although the present invention provides a useful solution for the gap scatter problem for stationary recording, it is not limited thereto, but operates equally well to correct gap scatter in continuous recording. Moreover, operation above saturation levels is not required if below saturation recording is used. In such instances the height as well as the length of a magnetization pattern is changed. Thus although the invention is particularly described using flux levels which oversaturate the tape, it is possible to use signals whose amplitude is below the saturation level, to cause the production of a flux pattern whose length is varied in proportion to the signal applied in accordance with the invention concepts discussed hereinbefore. That is, as shown in FIGURES 3 and 4, Gaussian flux distribution is generated when using below saturation recording as is well known in the art of magnetic recording. Thus an increase in the length (as well as the height) of the magnetization pattern is produced by using a current pulse whose amplitude varies within values below that required to produce saturation of the tape. Conventional binary recording modes such as RZ, NRZ, NRZI and the like may be employed by appropriate choice of the recording and reproducing circuits. Furthermore, the group of adjustable resistors 17 for varying current pulse amplitude has been shown by way of example only. A group of variable amplifiers can be used in the same manner to amplify each signal above tape saturation by an amount proportional to the misalignment of its corresponding head from the frame center line. Other appropriate techniques can also be used to vary the magnitude of the current pulses. The scope of the present invention is defined only by the following claims.

What is claimed is:

1. A system for recording precisely parallel digital signals on a magnetic tape, and including a tape transport for selectively driving the tape, a multi-channel head assembly disposed in contact with the tape and including a plurality of individual heads disposed approximately along a transverse reference line extending across the tape, the individual heads being subject to slight longitudinal misalignment relative to said reference line, the combination comprising, a data source for generating parallel digital data signals coupled to the head assembly, amplifying means coupled to the data source for amplifying the signals to a selected voltage level, and adjustable means coupled between the amplifying means and the head assembly for varying the amplitudes of each amplified signal in proportion to the degree of misalignment of each respective head.

2. A system for recording digital data in a computer compatible format including the combination of: an incrementally operable magnetic tape transport; a magnetic tape driven by said transport; a multi-channel magnetic head assembly disposed in contact with the tape, the head assembly having a number of individual heads disposed along a central transverse line relative to the magnetic tape, and the individual heads of the multi-channel head assembly being subject to gap scatter; a source of data providing a plurality of individual binary digit signals in parallel to represent an individual character; a plurality of record amplifiers each coupled to receive a different one of the binary digit signals from the source of data and each coupled to energize a different one of the heads of the multi-channel head assembly; control means coupled to the source of data and coupled to operate the magnetic tape transport, to initiate the incrementing movement after recordation of a given data character; and means for coupling the source of data to the magnetic head assembly for variably modifying the amplitudes of the recorded signals to establish different levels of over-saturation of the heads in the individual channels, the degree of over-saturation varying in accordance with the position of the gap of the individual head relative to the central transverse line.

3. A system for recording precisely parallel digital signals comprising a magnetic tape, an incrementally operable tape transport to drive the tape, a multi-channel head assembly disposed in contact with the tape, the gaps in the individual heads of the head assembly lying approximately along a transverse reference line in the tape, but each gap being displaced slightly in a longitudinal direction from said transverse line, an adjustable impedance coupled to each head of the head assembly, a record amplifier coupled to each adjustable impedance, data source means coupled to each record amplifier and generating binary digital signals, each record amplifier amplifying the binary digital signals above the level sufficient to magnetically saturate the tape, each adjustable impedance attenuating the amplified signal from its corresponding record amplifier to a level remaining above the tape saturation level by an amount proportional to the longitudinal displacement of its corresponding head from the transverse reference line, and control means coupled to the data source means and the tape transport for initiating an incremental tape movement after the recording of a binary character, such that the parallel current pulses representing a binary character, being variably attenuated above the tape saturation level, induce magnetization patterns of variable length on the tape, the lengths varying in proportion to the longitudinal displacement of the gap in the corresponding head from the central reference line, thus translating selected points of maximum flux gradient in the recorded patterns into precise parallel alignment so that the first peaks of the induced current on playback lie in precise time coincidence.

4. A system for recording precisely parallel digital signals comprising a magnetic tape, a tape transport for driving the tape, a multi-channel head assembly disposed in contact with the tape having a number of individual heads disposed approximately along a transverse reference line in the tape, the individual heads being subject to slight longitudinal misalignment relative to said reference line, a data source for generating parallel digital data signals coupled to the head assembly, amplifying means for amplifying the signals above the level required to magnetically saturate the tape disposed between and coupling the data source and head assembly, and means coupled to the amplifying means for varying the amplitudes of each amplified signal in proportion to the degree of misalignment of its corresponding head from the transverse reference line while maintaining the signals above the level needed to magnetically saturate the tape.

5. A system for recording precisely parallel digital signals comprising a magnetic medium, means for driving the magnetic medium, a multi-channel head assembly disposed in close relation with the magnetic medium having a number of individual heads disposed approximately along a transverse reference line in the magnetic medium, the individual heads being subject to a slight longitudinal misalignment relative to said reference line, a data source for generating parallel digital data signals coupled to the head assembly, and means disposed between and coupling the data source and head assembly for variably amplifying each signal above the level needed to magnetically saturate the magnetic medium and in proportion to the degree of misalignment of its corresponding head from the transverse reference line.

References Cited

UNITED STATES PATENTS

| | | | |
|---|---|---|---|
| 3,264,622 | 8/1966 | Gerlach | 340—174.1 |
| 3,263,223 | 7/1966 | Zenzefilis | 340—174.1 |

BERNARD KONICK, *Primary Examiner.*

A. I. NEUSTADT, *Assistant Examiner.*